United States Patent [19]

Yoshioka et al.

[11] Patent Number: 4,460,283
[45] Date of Patent: Jul. 17, 1984

[54] DAMPED BEARING DEVICE

[75] Inventors: Masahiro Yoshioka; Kazuo Takeda, both of Ibaraki, Japan

[73] Assignee: Hitachi, Ltd., Tokyo, Japan

[21] Appl. No.: 371,570

[22] Filed: Apr. 26, 1982

[30] Foreign Application Priority Data

Apr. 30, 1981 [JP] Japan .................................. 56-63958
Apr. 30, 1981 [JP] Japan .................................. 56-63959
May 13, 1981 [JP] Japan .................................. 56-70751
May 18, 1981 [JP] Japan .................................. 56-73549

[51] Int. Cl.³ ............................................ F16C 27/02
[52] U.S. Cl. ..................................... 384/119; 384/215
[58] Field of Search ................ 384/100, 99, 103, 104, 384/106, 105, 117, 119, 124, 215, 224, 306; 308/184 A, 184 R

[56] References Cited

U.S. PATENT DOCUMENTS

| | | | |
|---|---|---|---|
| 3,709,570 | 1/1973 | Galbato ............................ | 308/184 R |
| 4,027,931 | 6/1977 | Striefert ............................. | 384/117 |
| 4,084,861 | 4/1978 | Greenberg et al. ............ | 308/184 R |
| 4,214,796 | 7/1980 | Monzel et al. .................. | 308/184 R |
| 4,337,982 | 7/1982 | Moringiello et al. ...... | 308/184 A X |
| 4,353,604 | 10/1982 | Dulberger et al. ......... | 308/184 R X |

FOREIGN PATENT DOCUMENTS 1,077,007 3/1960 Fed. Rep. of Germany.

*Primary Examiner*—Stuart S. Levy
*Assistant Examiner*—David Werner
*Attorney, Agent, or Firm*—Antonelli, Terry & Wands

[57] ABSTRACT

A damped bearing device operative to damp vibration acting on a bearing journalling a rotary shaft includes a spring body resiliently supporting the bearing with respect to a housing. The spring body includes a spring portion arranged on the outer peripheral side of the bearing to minimize the axial dimensions of the bearing device without increasing the stress produced in the spring portion of the spring body.

6 Claims, 26 Drawing Figures

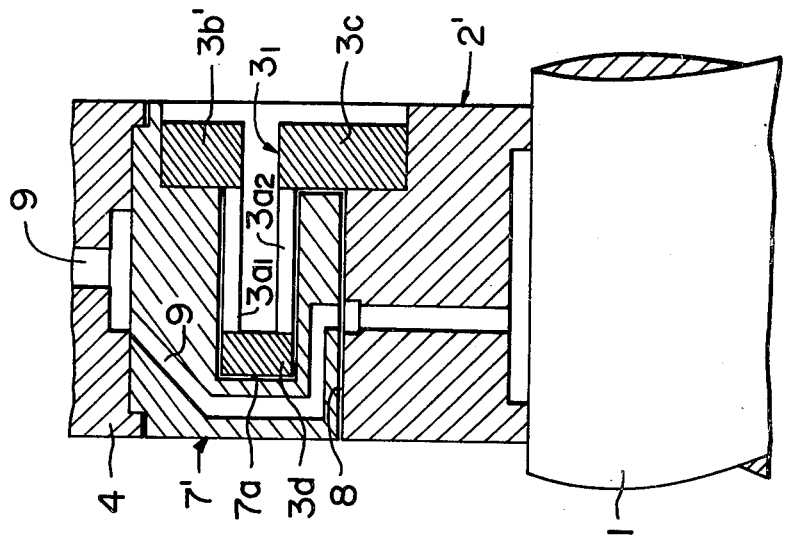
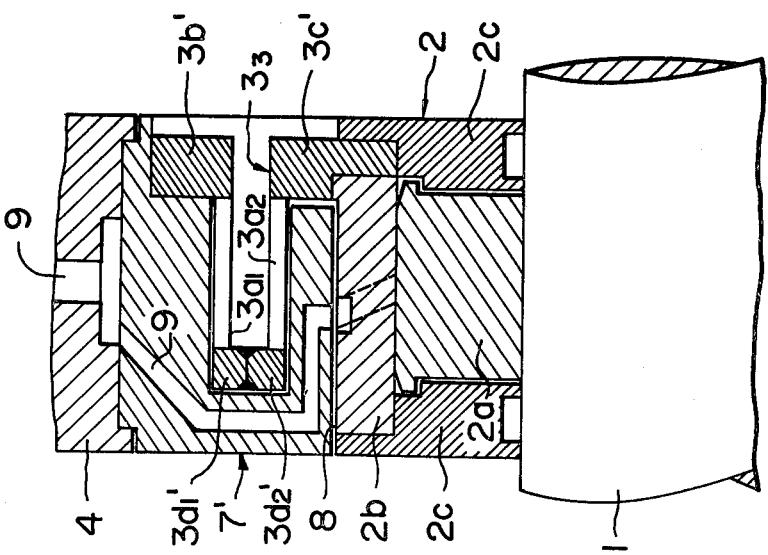

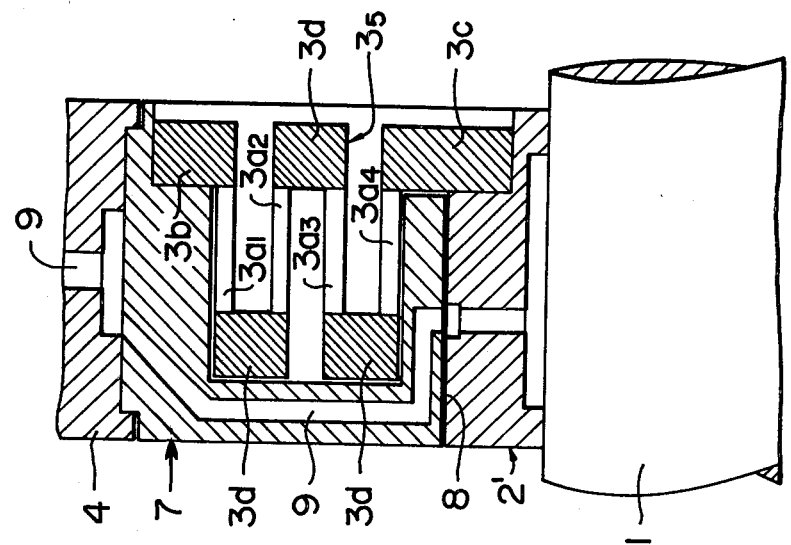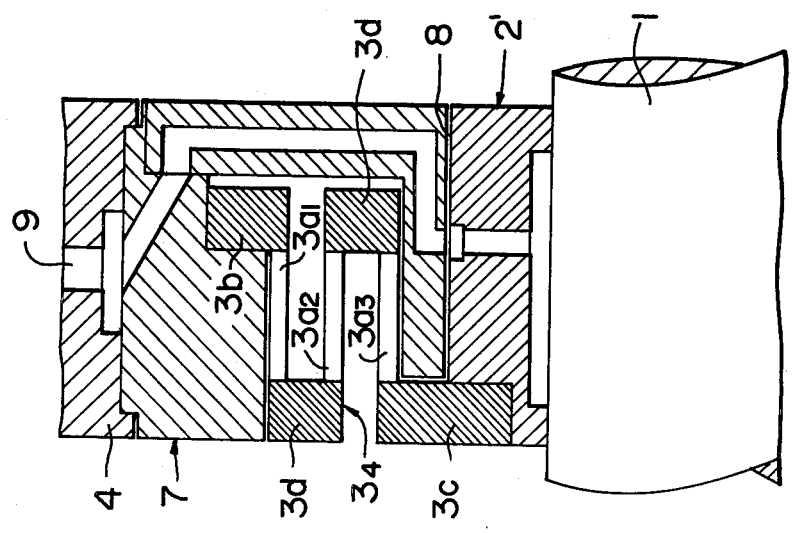

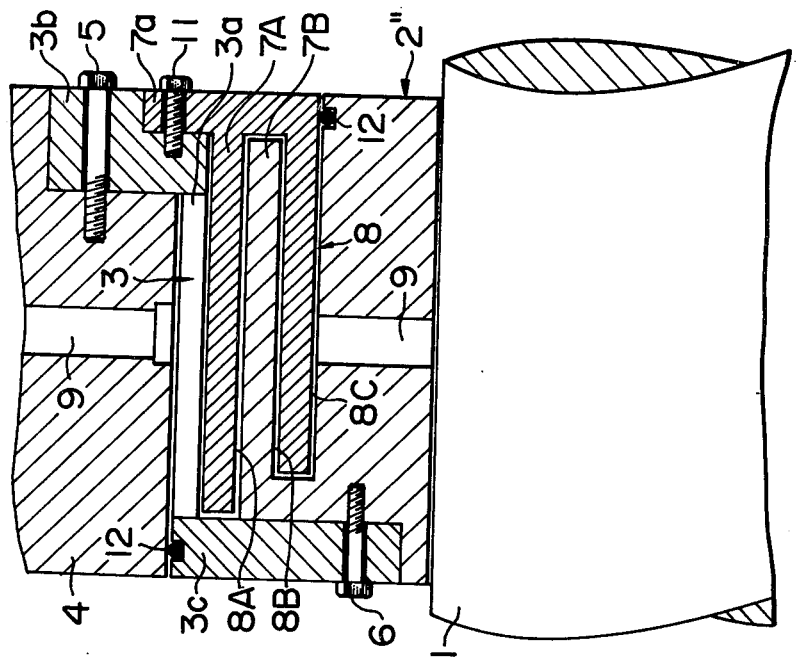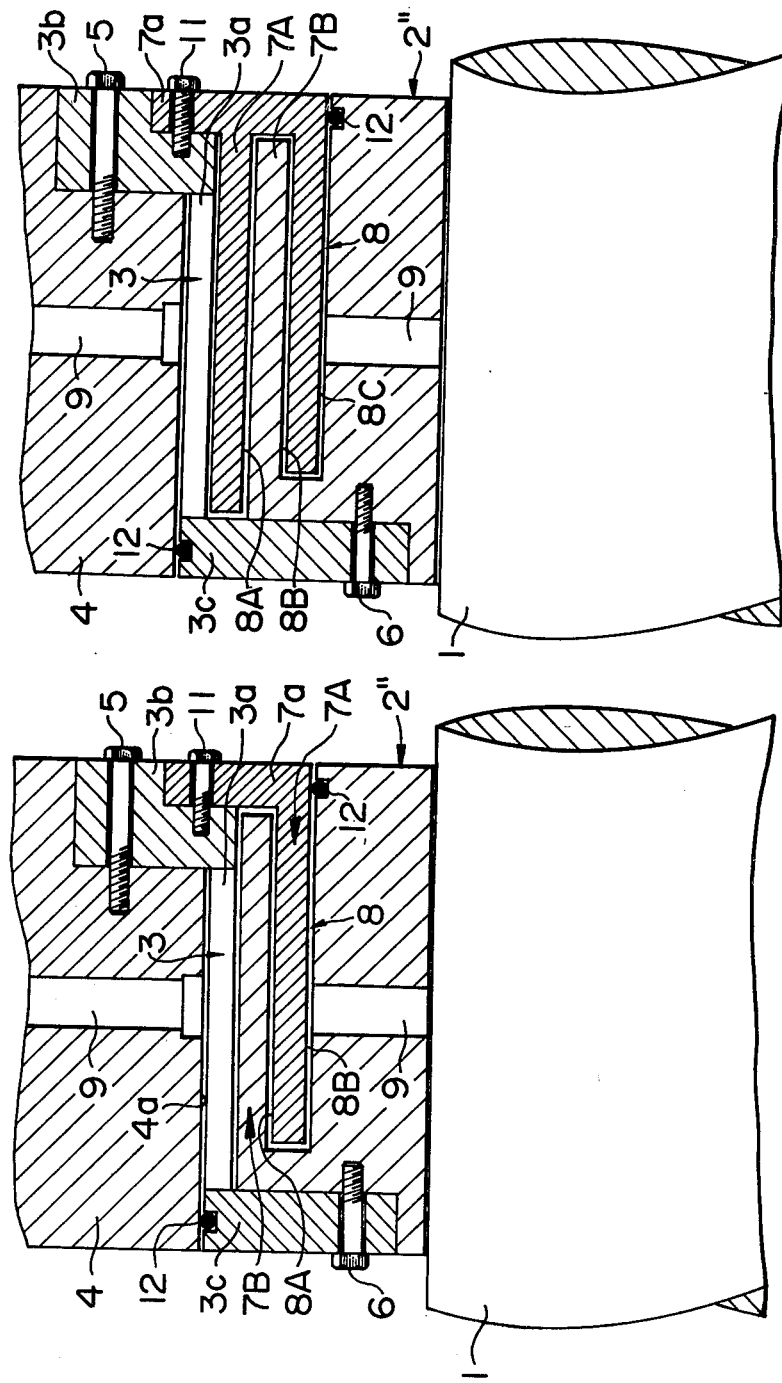

DAMPED BEARING DEVICE

BACKGROUND OF THE INVENTION

This invention relates to a damped bearing device suitable for use with a high-speed rotary machine, such as a compressor, turbine, etc., and, more particularly, to a damped bearing device for rotary machines which operate through a plurality of critical speed ranges.

In recently developed rotary machines, there is a tendency to operate the rotary machines in a high speed range which exceeds a plurality of critical speed ranges. When a rotary member of a rotary machine is driven to operate through a plurality of critical speed ranges, the amplitude of vibration becomes large, and a vibration of an increased amplitude is transferred from the rotary shaft to the bearings. Thus, a shortening of the service life occurs and the bearings are damaged thereby rendering the rotary member unusable in some cases. It would be impossible to check the vibration occurring in the rotary shaft system.

It is important that the bearings be provided with means for damping vibration in order that rotation of the rotary shat in higher speed ranges may be realized and at the same time the service life of the bearings may be prolonged. In, for example, U.S. Patent Specification 4,027,931 corresponding to West German Patent Laid-Open No. 26 44 026 and Swiss Pat. No. 612,250 a device for damping bearings has been proposed wherein a spring body is provided for resiliently supporting a bearing which journals a rotary shaft, and a damper portion, in the form of a squeeze film, is formed between the bearing and a housing. The spring body is secured at one end thereof to a side of the housing and at the other end thereof to a side of the bearing and includes a spring portion performing a spring action which is of a so-called cage type construction including a plurality of ribs arranged parallel to the axis of the rotary shaft. When the damped bearing of this construction is used with a rotary machine of a large size, such as a compressor, turbine, etc., high stress would be produced in the spring portion of the spring body because the weight of the rotary machine is borne by the spring body, causing the risk of the spring portion of the spring body being ruptured. In this type of damped bearing, it is essential to reduce the length of the spring portion if it is desired to minimize the stress produced in the spring portion. However, in a bearing damping device of this type, generally the spring body is mounted in a manner to extend laterally of the bearing thereby increasing the axial length and, consequently, this type bearing device is not suitable for construction of rotary machines which attempt is intended to minimize size of the machines while increasing the operation speed. However, if an attempt is made to forcibly reduce the length of the spring body of the cage type construction by reducing the length of the spring portion of the spring body, the stress produced in the spring portion would become excessively great, thereby causing rupture of the spring portion of the spring body. Also, in this type of damped bearing, the bearing would shift downwardly due to the weight of the rotary member because the bearing is supported by the spring body. As a result, the working gap of the squeeze film of the damper portion would, in a vertical direction, become nonuniform so that the damper portion could not satisfactorily perform its damping action. To obviate this problem, in the device described in aforementioned U.S. Pat. No. 4,027,931, an auxiliary spring is provided to correct flexing that would be caused by the weight of the rotary member and the rotary shaft. In this type of damped bearing, it is essential that the spring rigidity of the spring portion of the spring body and the damping action of the damper portion be isotropoc with respect to the rotary member, in order to minimize the amplitude of vibration. However, in this type of damped bearing, no means have ever been provided for obtaining isotropy of spring rigidity and action of the damper damping portion. In the damper portion, the space for the squeeze film to act is relatively small, so that very fine adjustments are required in giving the designed value to the space in working on the space in view of the current conditions of working and assembling operations.

SUMMARY OF THE INVENTION

An object of this invention is to provide a damped bearing device capable of reducing axial dimensions without increasing the stress produced in the spring portion of the spring body.

Another object of the invention is to provide a damped bearing device capable of reducing axial dimensions while positively avoiding damage to the spring portion of the spring body by reducing the stress produced therein.

Still another object of the present invention is to provide a damped bearing device capable of obtaining a compact overall size in a damped bearing device and tolerating a reduction in the precision with which the component parts are worked and assembled.

A further object of the invention is to provide a damped bearing device wherein the gap for the squeeze film serving as a damper portion to act in is rendered uniform circumferentially and the spring rigidity and damper damping have isotropy with respect to the damped vibration.

To accomplish the aforesaid objects, the invention provides, in a damped bearing device including a bearing journalling a rotary shaft, a spring body resiliently supporting the bearing with respect to a housing, and a damper portion in the form of a squeeze film formed between the bearing and the housing, the feature that the spring body comprises a housing-side flange secured to the housing, a bearing-side flange secured to the bearing, and a spring portion interposed between the two flanges and arranged on the outer peripheral side of the bearing in a manner to extend axially of the rotary shaft to have a spring function.

Also, the invention provides, in a damped bearing device including a bearing journally a rotary shaft, a spring body resiliently supporting the bearing with respect to a housing, and a damper portion in the form of a squeeze film formed between the bearing and the housing, the feature that the spring body comprises a housing-side flange secured to the housing, a bearing-side flange secured to the bearing, and a spring portion having a spring function interposed between the two flanges and arranged on the outer peripheral side of the bearing in a manner to extend axially of the rotary shaft, and biasing means for adjusting an annular gap formed in said damper portion is provided, said biasing means comprising peripheral surfaces formed on at least two members of the damped bearing device such that they are eccentric with respect to the axis of the inner peripheral surface of the housing, and are rotatable about their respective axes to render a uniform annular gap.

Additional and other objects, features and advantages of the invention will become apparent from the description set forth hereinafter when considered in conjunction with the accompanying drawings.

BRIEF DESCRIPTION OF THE DRAWINGS

FIG. 5 is a vertical sectional view of a damped bearing comprising a fifth embodiment;

FIG. 6 is a vertical sectional view of a damped bearing comprising a sixth embodiment;

FIG. 7 is a vertical sectional view of a damped bearing comprising a seventh embodiment;

FIG. 8 is a vertical sectional view of a damped bearing comprising an eighth embodiment;

FIG. 11 is a vertical sectional view of a damped bearing comprising an eleventh embodiment;

FIG. 12 is a vertical sectional view of a damped bearing comprising a twelfth embodiment;

DESCRIPTION OF THE PREFERRED EMBODIMENTS

Figure 1:
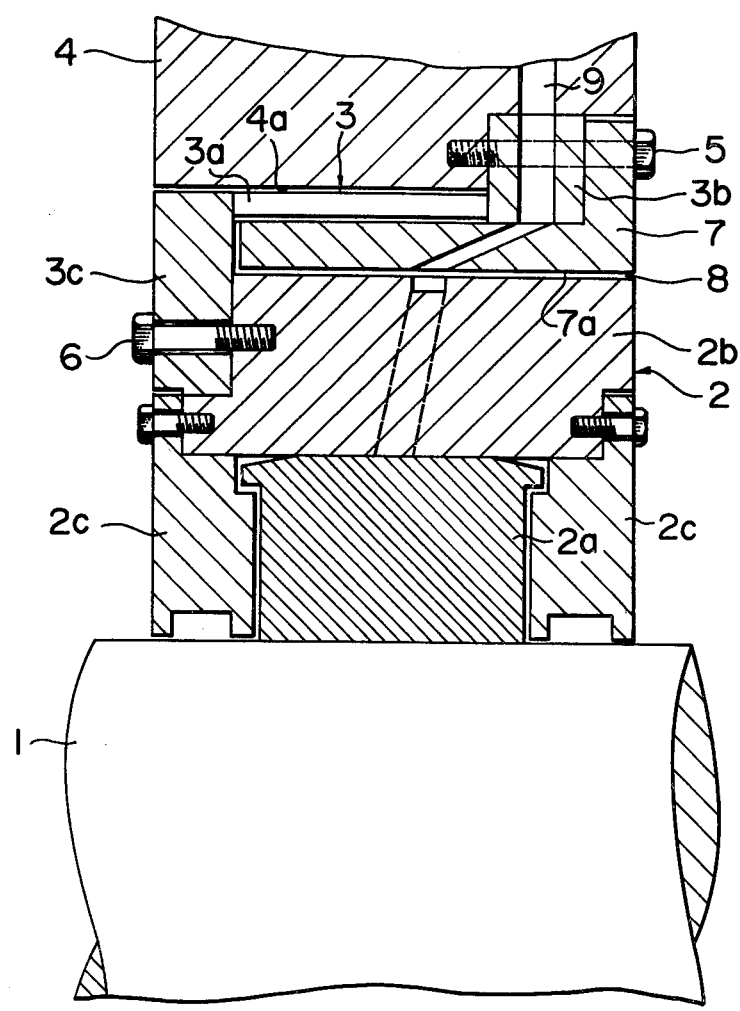
FIG. 1 is a vertical sectional view of a damped bearing comprising a first embodiment of the invention.

Referring now to the drawings wherein like reference numerals are used throughout the various views to designate like parts and, more particularly, to FIG. 1, according to this figure, a rotary shaft 1, adapted to be rotated at high speeds, is journalled by a damped bearing generally designated by the reference numeral 2 comprising a plurality of tilting pads 2a arranged on the outer circumferential surface of the rotary shaft 1 for directly journalling same, a holding section 2b for holding in place the tilting pads 2a, and seal covers 2c for defining a space in which the tilting pads 2a are located and filling the space with lubricant so that bearing surfaces of the pads 2a are supplied with lubricant. A spring body generally designated by the reference numeral 3 resiliently supports the bearing 2 with respect to a housing 4, with the spring body 3 comprising a housing-side flange 3b, a bearing-side flange 3c, and a plurality of peripherally disposed ribs 3a arranged in a manner so as to connect the two flanges 3b and 3c together and to serve as a spring portion having a spring function. The housing-side flange 3b of the spring body 3 is secured by bolts 5 to a side of the housing 4, and the bearing-side flange 3c is secured by bolts 6 to a side of the holding section 2b. The ribs 3a, having a spring function, are arranged on an outer peripheral side of the bearing 2 along an inner peripheral side of the bearing 2 along an inner peripheral surface 4a of the housing 4 in a manner to connect the flanges 3b and 3c together. Inserted between an inner periphery of the spring body 3 and an outer periphery of the holding section 2b of the bearing 2 is a damper portion forming member 7 secured at one end thereof to the housing 4 through the bolt 5. The damper portion forming member 7 is formed with a damper portion 8 in the form of a squeeze film formed between an inner peripheral surface 7a of the member 7 and an outer peripheral surface of the holding section 2b of the bearing 2. A supply of lubricant is fed to the damper portion 8 and the bearing 2 through a feed oil passageway 9 formed in the housing 4, flange 3b and damper portion forming member 7.

The bearing 2 of this construction has a smaller axial length as compared with bearings of the prior art and its size is also smaller than prior art bearings. The stress produced in the ribs 3a does not increase because their axial length need not be reduced.

Figure 2:
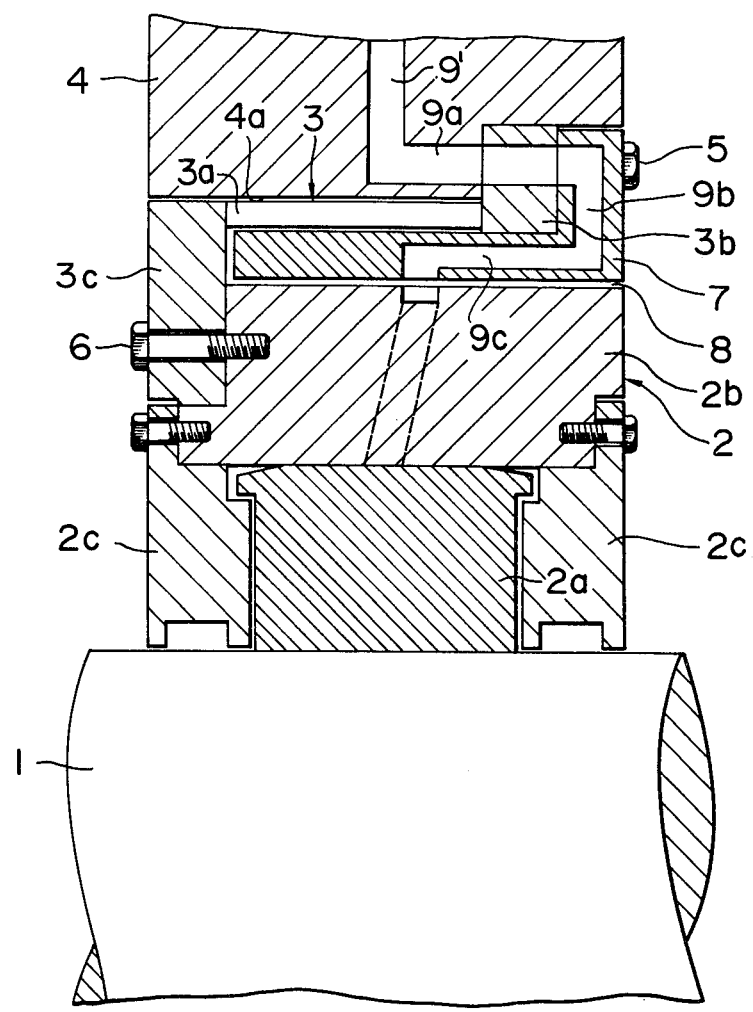
FIG. 2 is a vertical sectional view of a damped bearing comprising a second embodiment.

It is also possible, as shown in FIG. 2 to provide a feed oil passageway 9' for supplying lubricant to the damper portion 8 and the bearing 2, with the feed oil passageway 9' comprising a horizontal portion 9a, extending through the housing 4, flange 3b and portion of the member 7, and a vertical portion 9b provided in the member 7 and communicating with a further horizontal portion 9c.

Figure 3:
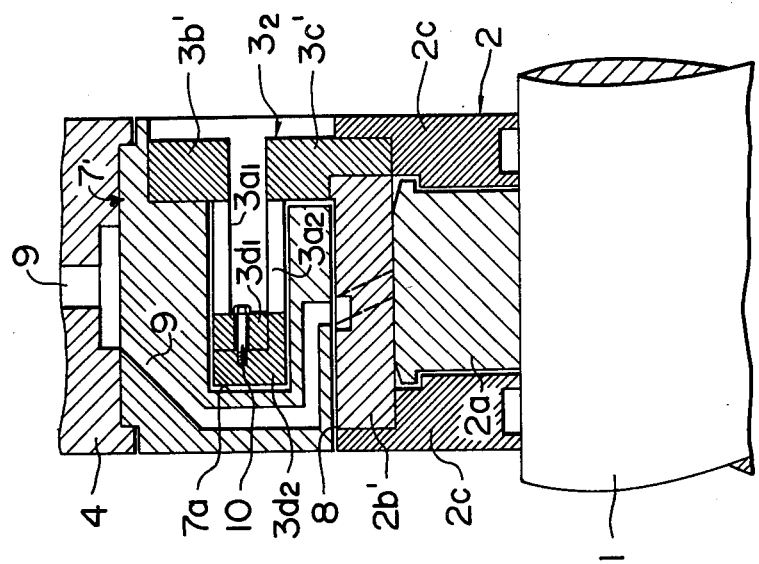
FIG. 3 is a vertical sectional view of a damped bearing comprising a third embodiment.

In FIG. 3 a damper portion forming member 7' is directly secured to the inner peripheral surface of the housing 4 to define the damper portion 8 between the outer peripheral surface of the bearing 2 and the inner peripheral surface of the damper portion forming member 7'. In addition to a housing-side flange 3b' secured to the housing 4, a bearing-side flange 3c' is secured to the bearing 2 with a plurality of ribs 3a1 and 3a2 being arranged in a plurality of layers (two layers in FIG. 3) between the two flanges 3b' and 3c' to perform a spring function. A spring body generally designated by the reference numeral $3_1$ comprises an intermediate flange $3d$ interconnecting the plurality of layers of the ribs $3a1$ and $3a2$ at their end portions. The plurality of ribs $3a1$ and $3a2$ performing the spring function are arranged peripherally in spaced-apart relation in parallel to the axis of the rotary shaft 1 and located on the outer peripheral side of the bearing 2. More specifically, the ribs $3a1$ and $3a2$ and the intermediate flange $3d$ are located in a recess $7a$ formed in the damper portion forming member $7'$. The housing-side flange $3b'$ is not directly secured to the housing 4 but connected to the housing 4 through the damper portion forming member $7'$. In other respects, the third embodiment is no different from the embodiments shown in FIGS. 1 and 2.

In the embodiment of FIG. 3, by virtue of the arrangement of the ribs $3a1$ and $3a2$, of the spring body $3_1$ in two layers, it is possible to increase the length of the ribs without increasing the axial length of the spring body $3_1$. Thus, the stress produced in the ribs $3a1$ and $3a2$ can be minimized to positively avoid damage thereto. Also, with the ribs $3a1$ and $3a2$ located on the outer peripheral side of the bearing 2, the axial dimensions of the damped bearing as a whole can be substantially reduced, so that it is possible to obtain an overall compact sized damped bearing.

Figure 4:
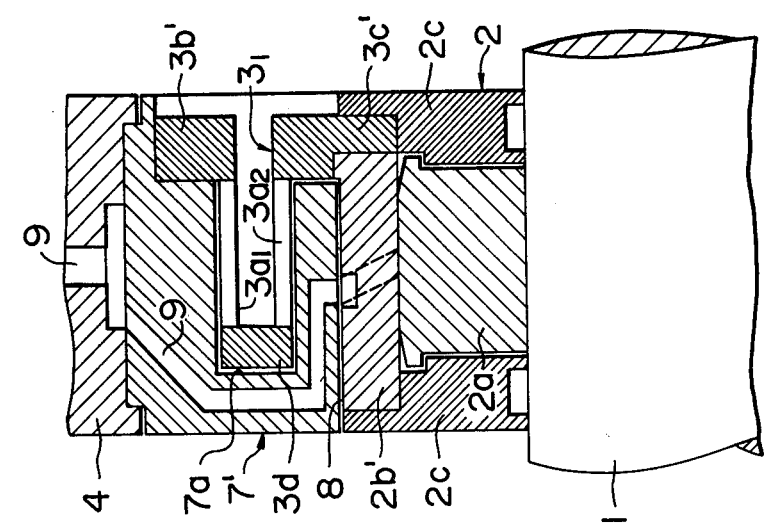
FIG. 4 is a vertical sectional view of a damped bearing comprising a fourth embodiment.

In FIG. 4, a spring body generally designated by the reference numeral $3_2$ the ribs $3a1$ and $3a2$, arranged in two layers and respectively formed at their ends with intermediate flanges $3d1$ and $3d2$ which are connected together by a bolt 10. By virtue of an arrangement wherein the plurality of layers of ribs $3a1$ and $3a2$ are connected together the same effects as described above in connection with FIG. 3 can be achieved in addition to facilitating the fabrication of the spring body $3_2$.

As shown in FIG. 5 intermediate flanged $3d1'$ and $3d2'$ are respectively formed at the end of the ribs $3a1$ and $3a2$ and are joined together by welding or connected together as by pressing against each other so as to form a spring body generally designated by the reference numeral $3_3$.

In FIG. 6 a bearing generally designated by the reference numeral $2'$ is provided which is not of the tilting pad type but rather an ordinary bearing. Thus, the invention can have application in an ordinary bearing without regard to the difference in the types of bearings journalling the rotary shaft 1.

In the bearing of FIG. 7 a spring body generally designated by the reference numeral $3_4$ is provided with three layers of ribs $3a1$, $3a2$ and $3a3$ with two intermediate flanges $3d$ being provided to connect the ribs $3a1$, $3a2$ and $3a3$ together.

As shown in FIG. 8 a spring body generally designated by the reference numeral $3_5$ includes four layers of ribs $3a1$, $3a2$, $3a3$ and $3a4$ with three intermediate flanged $3d$ being provided to connect the ribs $3a1$, $3a2$, $3a3$ and $3a4$ together.

As described hereinabove in connection with FIGS. 7 and 8, the ribs $3a1$, $3a2$, $3a3$ and $3a4$ constituting the spring portion of the spring body $3_4$ or $3_5$ can be formed in any number of layers as desired. Thus, by increasing the number of layers of ribs, it is possible to increase the overall size of the ribs or the spring portion, to thereby minimize the stress produced in the ribs to positively avoid damage thereto.

In the embodiments shown in FIGS. 3-8, the ribs constituting the spring portion of the respective spring body $3_1$, $3_2$, $3_3$, $3_4$, $3_5$ are provided in a plurality of layers. With this construction, by arranging the ribs in a manner not to overlay each other radially, it is possible to increase the uniformity of the rigidity of the respective spring bodies. Also, it is possible to split the respective bodies into a plurality of spring bodies when the ribs are arranged in a plurality of layers. Thus, such spring bodies would be located each on either end of the bearing 2 or $2'$ to support the bearing at opposite ends thereof. In this case, the bearing 2 or $2'$ is supported at opposite ends thereof by the spring bodies and moves vertically while being maintained horizontally, with the result that the gap of the damper portion 8 can be made uniform axially.

Figure 9:
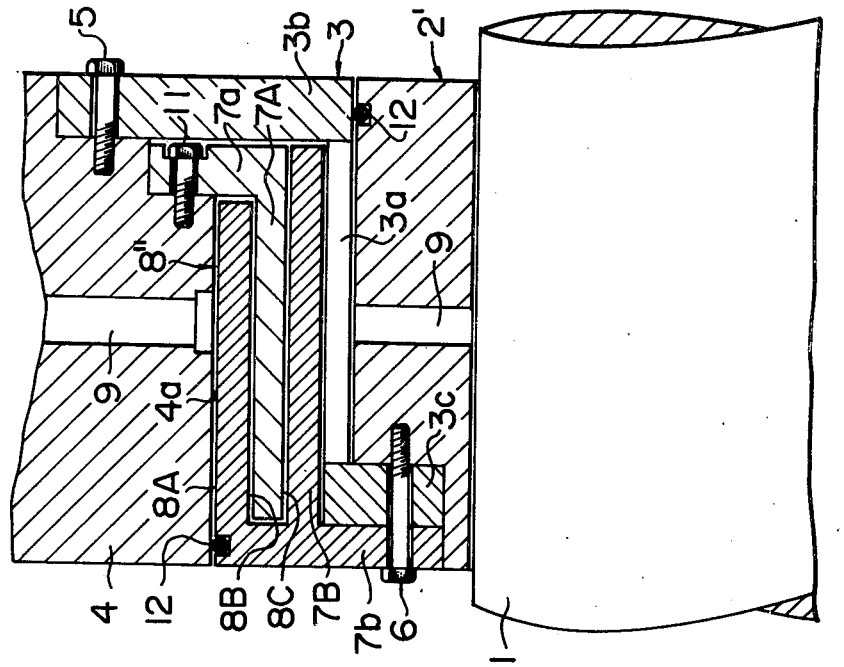
FIG. 9 is a vertical sectional view of a damped bearing comprising a ninth embodiment.

In FIG. 9, the ribs $3a$ of the spring body 3 are located near the outer peripheral surface of the bearing $2'$. Interposed between the outer side of the ribs $3a$ of the spring body 3 and the inner peripheral surface $4a$ of the housing 4 is a damper portion generally designated by the reference numeral $8'$ in the form of a squeeze film arranged in a multiple layer about the axis of the rotary shaft 1. The plurality of layers of damper portion $8'$ are composed of a first damper portion forming member generally designated by the reference numeral 7A and a second damper portion forming member generally designated by the reference numeral 7B. The first damper portion forming member 7A has a flange $7a$ secured by bolts 11 to the housing 4 so that the member 7A can be located outside the ribs $3a$ of the spring body 3, and the second damper portion forming member 7B has a flange $7b$ secured to the bearing 2 by the bolts 6 through the bearing-side flange $3c$ of the spring body 3 so that the member 7B can be located between the inner peripheral surface $4a$ of the housing 4 and the first damper portion forming member 7A. The first and second damper forming members 7A and 7B cooperate with each other to form a first damper portion 8A, between the inner peripheral surface of the housing 4 and the second damper portion forming member 7B, and a second damper portion 8B, between the first damper portion forming member 7A and the second damper portion forming member 7B. A seal member 12, such as an O-ring is provided, for preventing leaks of the lubricant supplied to the damper portion $8'$. Lubricant flows through the feed oil passageway 9 formed in the housing 4 into the damper portions 8A and 8B and is supplied therefrom to the bearing surface through a feed oil passageway 9 formed in the bearing $2'$, after flowing in and through the damper portions 8A and 8B. Other parts of the embodiment shown in FIG. 9 are similar to those shown in the embodiments described hereinabove, so that their description is omitted.

By the arrangement of FIG. 9, a plurality of damper portions 8A and 8B are formed about the axis of the rotary shaft 1 between the ribs $3a$ of the spring body 3 and the inner peripheral surface $4a$ of the housing 4. By virtue of this construction, it is possible to obtain an increased effective length of the damper portion, so that the gap of the damper portion $8'$ can be widened. This is conducive to a tolerance of an ordinary finish with which working and assembling are performed. Also, the arrangement whereby the spring body 3 is interposed between the bearing $2'$ and the housing 4 enables, as in the embodiments described hereinabove, the axial dimensions of the bearing itself to be reduced.

Figure 10:
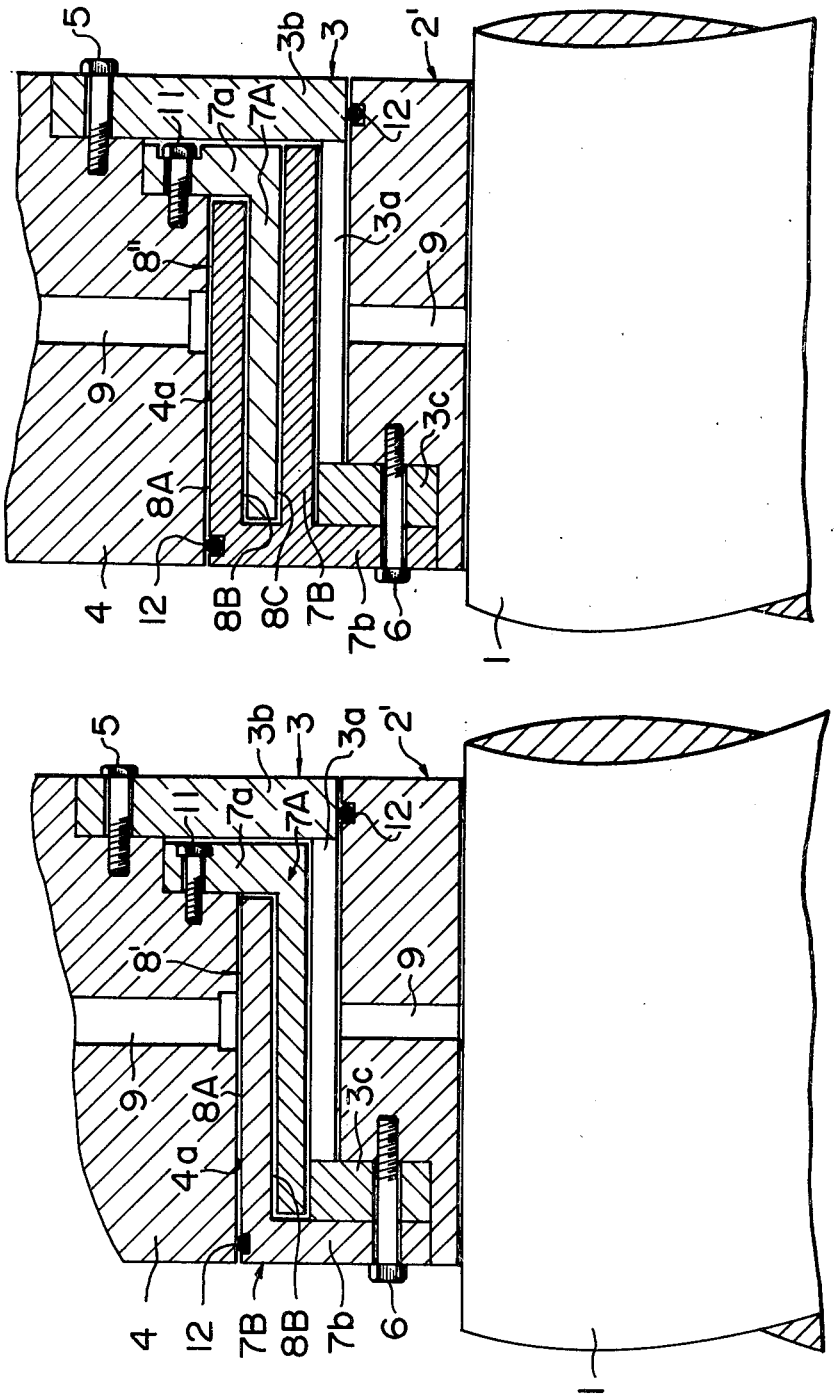
FIG. 10 is a vertical sectional view of a damped bearing comprising a tenth embodiment.

It is also possible, as shown in FIG. 10 to provide a triple construction damper portion generally designated by the reference numeral $8''$ between the ribs $3a$ of the spring body 3 located on the outer side of the bearing 2 and the inner peripheral surface $4a$ of the housing 4. To obtain the damper portion $8''$ of triple construction, the second damper portion forming member 7B is constructed in a manner to hold the first damper portion forming member 7A in a small gap. This provides first, second and third damper portions 8A, 8B and 8C, so that this embodiment offers the advantage that the effective length of the damper portion can be increased over that of the embodiment shown in FIG. 9.

In FIG. 11 an ordinary bearing generally designated by the reference numeral 2″ is provided with the ribs 3a of the spring body 3 being arranged in a position near the inner peripheral surface 4a of the housing 4, and with the first and second damper portion forming members 7A and 7B are arranged between the ribs 3A of the spring body 3 and the outer side of the bearing 2″, to thereby provide the first and second damper portions 8A and 8B of the damper 8″. In this embodiment, the second damper portion forming member 7B is formed integrally with the bearing 2″. By this arrangement, the effective length of the damper portion can be increased as is the case with the embodiments described hereinabove.

As shown in FIG. 12, the first damper portion forming member 7A is constructed to hold the second damper portion forming member 7B in a small gap formed therein, to thereby provide the damper portions 8A, 8B and 8C in triple construction. In this embodiment, it is possible to obtain a greater effective length of the damper portion than in the embodiment shown in FIG. 11.

Figure 13:
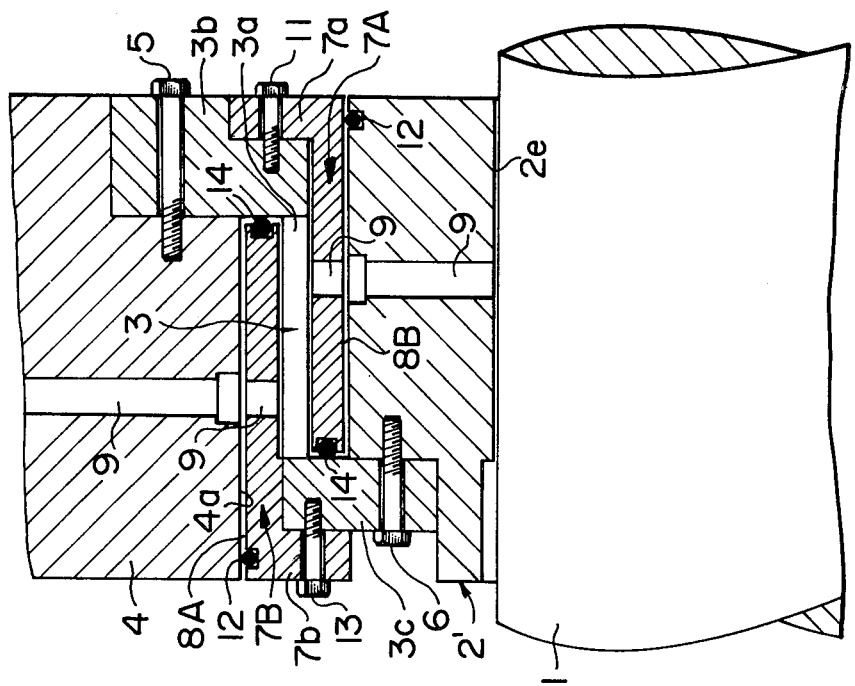
FIG. 13 is a vertical sectional view of a damped bearing comprising a thirteenth embodiment.

In FIG. 13, the ribs 3a of the spring body 3 are arranged in the central portion of a space between the outer side of the bearing 2 and the inner peripheral surface 4a of the housing 4, while the first damper portion forming member 7A is located in a small gap between the inner side of the ribs 3a and the outer side of the bearing 2′ and the second damper portion forming member 7B is located between the inner side of the rigs 3a and the inner peripheral surface 4a of the housing 4. The first damper portion forming member 7A is secured to the housing-side flange 3b of the spring body 3 by the bolts 11 and the second damper portion forming member 7B is secured to the bearing-side flange 3c of the spring body 3 by bolts 13.

In this construction, the first damper portion 8A is formed between the inner peripheral surface 4a of the housing 4 and the outer periphery of the second damper portion forming member 7B, and the second damper portion 8B is formed between the inner periphery of the first damper portion forming member 7A and the outer periphery of the bearing 2′. The result of this is that the damper portion can have its effective length increased.

Figure 14:
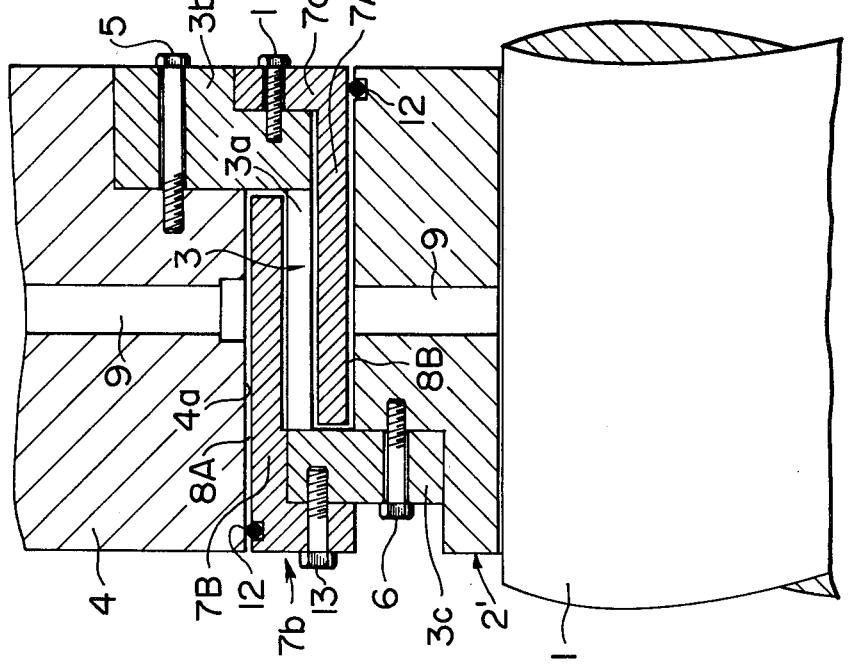
FIG. 14 is a vertical sectional view of a damped bearing comprising a fourteenth embodiment.

As shown in FIG. 14, a seal 14 is provided between the free end of the second damper portion forming member 7B and the housing-side flange 3b of the spring body 3 and between the free end of the first damper portion forming member 7A and the bearing-side flange 3c of the spring body 3 in the embodiment shown in FIG. 13, so that the first and second damper portions 8A and 8B can be made independent of each other. By this arrangement, the fluid entering the first damper portion 8A is supplied to the second damper portion 8B and a bearing surface 2e of the bearing 2′ through the respective feed oil passageways 9 formed in the second damper portion forming member 7B and the first damper portion forming member 7A. By this arrangement, the damper portion can be formed in double construction as in the embodiment shown in FIG. 13.

The arrangement of the seal 14 and the feed oil passageways 9 shown in FIG. 14 can have application in the embodiment shown in FIGS. 9–12 also. In the embodiments shown in FIGS. 9–14, the ribs 3a of the spring body 3 are in contact with lubricant at all times, so that corrosion of the ribs 3a can be avoided and their reliability and endurance can be increased.

FIGS. 15–20 provide an example of a damped bearing wherein at least two members constituting the damped bearing have their peripheral surfaces arranged eccentric with respect to an axis of the inner peripheral surface of a housing and rotatable about the axes thereof, to thereby adjust an annular gap of the damper portion uniformly.

Figure 15:
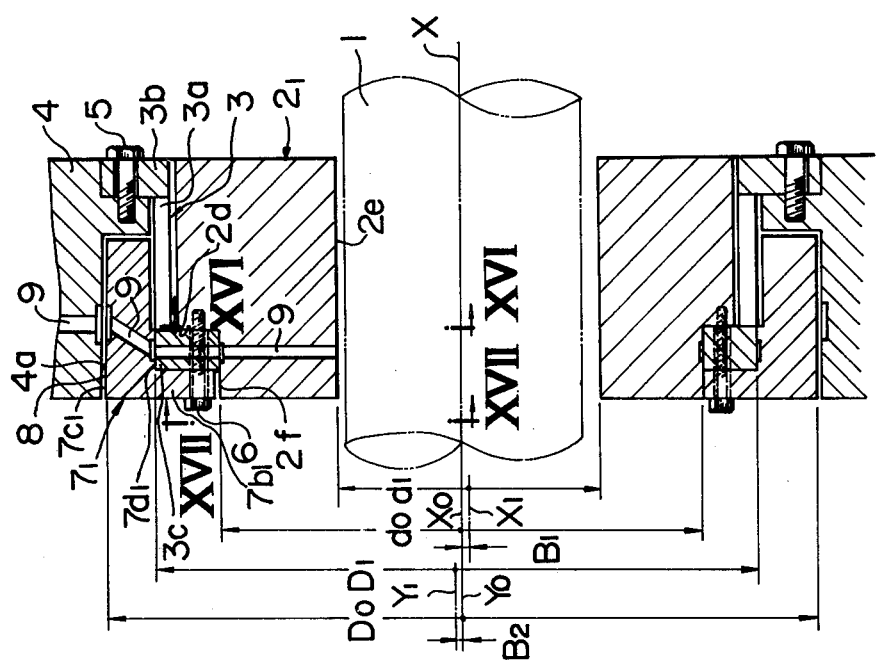
FIG. 15 is a vertical sectional view of a damped bearing comprising a fifteenth embodiment.

More particularly, as shown in FIG. 15, the damper portion forming member generally designated by the reference numeral $7_1$ has formed between an outer peripheral surface 7c1 and the inner peripheral surface 4a of the housing 4 a damper portion 8 in the form of a fluid film having a squeezing function. The ribs 3a of the spring body 3 are inserted axially between the inner side of the damper portion forming member $7_1$ and the outer side of a bearing generally designated by the reference numeral $2_1$, and the housing-side flange 3b is secured by bolts 5 to the side of the housing 4 while the bearing-side flange 3c is disposed in a stepped portion 2d of the bearing $2_1$, held between a flange 7b1 of the damper portion forming member $7_1$ and the bearing $2_1$ and secured in place by the bolt 6. By this arrangement, the ribs 3a of the spring body 3 are located on the outer peripheral side of the bearing $2_1$. The damper portion 8 and the bearing surface 2e of the bearing $2_1$ receive a supply of lubricant through the feed oil passageway 9 formed in the housing 4 and the feed oil passageways formed in the damper portion forming member $7_1$, bearing-side flange 3c and the bearing $2_1$.

Figure 16:
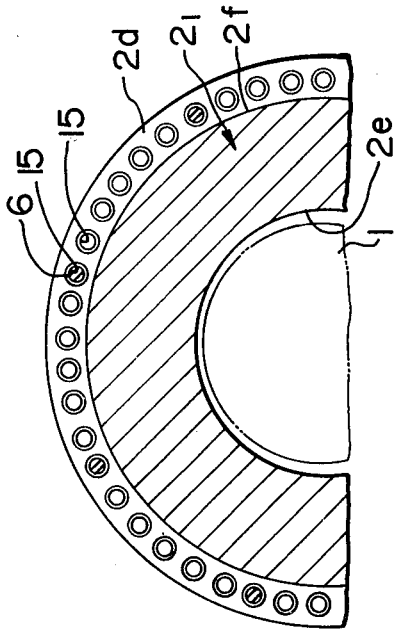
FIG. 16 is a view as seen in the direction of arrows XVI—XVI in FIG. 15.
Figure 17:
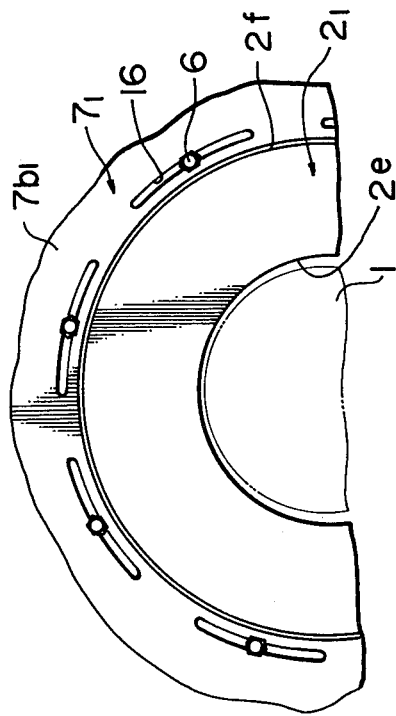
FIG. 17 is a view as seen in the direction of arrows XVII—XVII in FIG. 15.

An other peripheral surface 2f of the stepped portion 2d of the bearing $2_1$ has a center $X_0$ on the axis X of the rotary shaft 1 and a diameter d. The inner peripheral surface of the bearing surface 2e has a center $X_1$ displaced downwardly by $B_1$ with respect to the axis X of the rotary shaft 1 and a diameter $d_1$. The damper portion forming member $7_1$ has an outer peripheral surface 7c1 having a center $Y_0$ on the axis X of the rotary shaft 1 and a diameter $D_0$. The damper portion forming member $7_1$ has an inner peripheral surface 7d1 in contact with the outer peripheral surface of the bearing-side flange 3c which has a center $Y_1$ in a position displaced upwardly with respect to the axis X of the rotary shaft 1 and a diameter $D_1$. These eccentric positions are shown diagrammatically in FIG. 18. To rotate and fix the bearing $2_1$ relative to the damper portion forming member $7_1$ in any position as desired, the stepped portion 2d of the bearing $2_1$ is formed with a plurality of bolt holes 15 for the bolts 6 disposed peripherally as shown in FIG. 16. Also, as shown in FIG. 17, the flange 7b1 of the damper portion forming member $7_1$ may be formed with slots 16 to use same along with the bolt holes 15. In this case, the bolt holes 15 may be spaced apart from one another a greater distance or the damper portion forming member $7_1$ may be arranged finely in any desired position for rotation. If there is any reserve in space, a slot having an overlapping on the inner peripheral side or the outer peripheral side of the slot 16 shown in FIG. 17 may be provided. Other parts are similar to those shown in FIGS. 1–14, so that their description is omitted.

Figure 18:
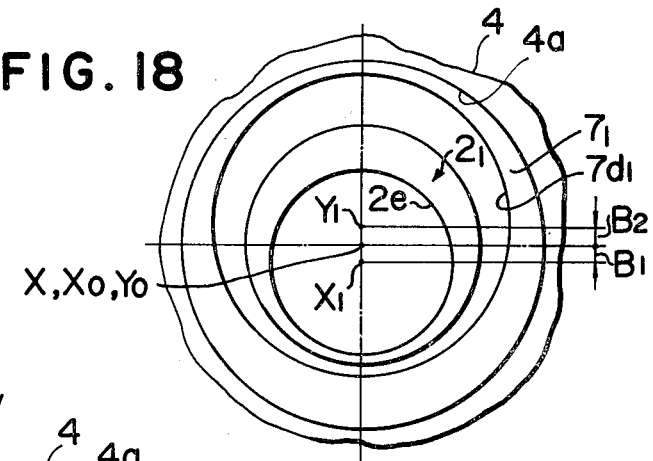
FIG. 18 is a diagram showing the eccentric positional relations established in the fifteenth embodiment of the damped bearing in conformity with the invention shown in FIG. 15.
Figure 19:
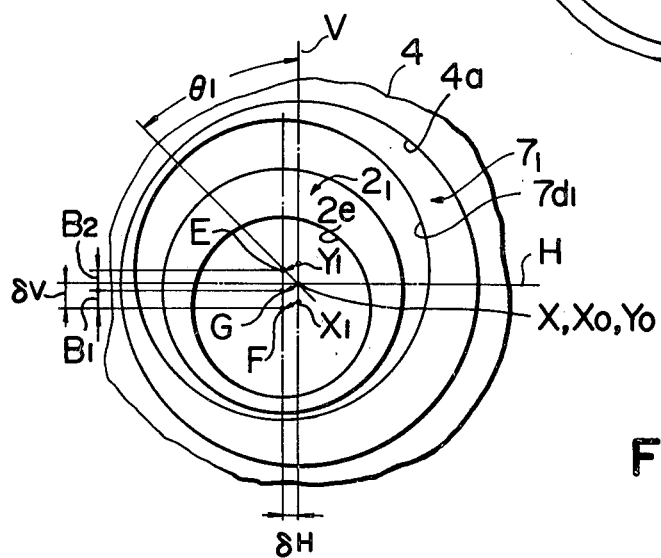
FIG. 19 is a diagram showing the condition obtained by rotating counterclockwise through an angle $\theta_1$ only the damper portion of the fifteenth embodiment of the damped bearing shown in FIG. 15 from the condition shown in FIG. 18.
Figure 20:
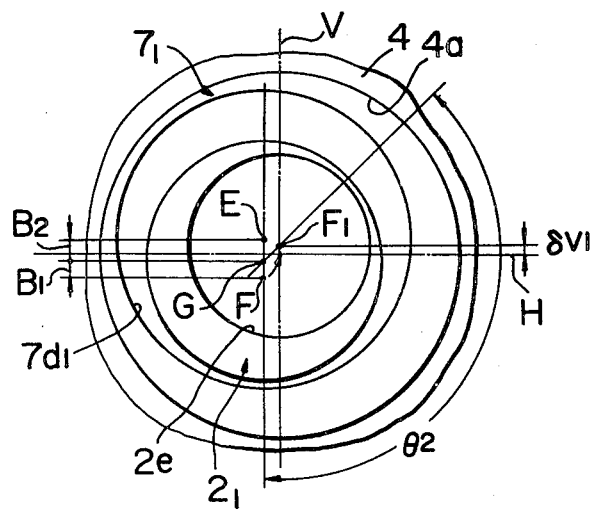
FIG. 20 is a diagram showing the condition obtained by adjusting the eccentricity and the direction of eccentricity of the bearing surface by rotating the bearing alone counterclockwise through an angle $\theta_2$ from the condition shown in FIG. 19, in the embodiment according to the invention shown in FIG. 15.

Operation of the embodiment of the damped bearing in conformity with the invention shown in FIG. 15 will be described. In FIGS. 18–20, the eccentric positional relations are exaggerated to enable the ecentric operation to be better understood. Assume that a desired eccentricity is provided vertically, for example, in the condition in which, as shown in FIGS. 15 and 18, the center $X_1$ of the bearing surfce $2e$ of the bearing $2_1$ is displaced downwardly by an eccentricity $B_1$ with respect to the axis X of the rotary shaft 1 or the inner peripheral surface $4a$ of the housing 4 and the center $Y_1$ of the inner peripheral surface $7d1$ of the damper portion forming member $7_1$ is displaced upwardly by an eccentricity $B_2$ with respect to the axis X. In this case, the bolts 6 are removed to allow the damper portion forming member $7_1$ and the bearing $2_1$ to rotate about the axis X. Then the damper portion forming member $7_1$ alone is rotated as shown in FIG. 19 counterclockwise through an angle $\theta_1$ form the position shown in FIG. 18. The result of this is that the center $Y_1$ of the inner peripheral surface $7d1$ of the damper portion forming member $7_1$ shifts to a point E, and the center $X_1$ of the bearing surface $2e$ of the bearing $2_1$ shifts to a point F. The center $X_0$ of the outer peripheral surface of the bearing 2 shifts to a point G. Thus, as the center $X_1$ of the bearing surface $2e$ of the bearing $2_1$ shifts to point F, it becomes eccentric horizontally by an amount $\delta H$ with respect to a perpendicular V passing through the axis X of the inner peripheral surface $4a$ of the housing 4 and vertically downwardly by an amount $\delta V$ with respect to a horizontal line H passing through the axis X. Then the center $X_1$ of the bearing surface $2e$ disposed in point F as shown in FIG. 19 is brought into agreement with the perpendicular V by rotating the bearing $2_1$ counterclockwise through an angle $\theta_2$ as shown in FIG. 20. As a result, the center $X_1$ of the bearing surface $2e$ of the bearing $2_1$ shifts to point F. Thus, it is possible to provide to the center $X_1$ of the bearing surface $2e$ an eccentricity $\delta V_1$ vertically upwardly. By this arrangement, the bearing surface $2e$ of the bearing $2_1$ can be displaced upwardly in a manner to cancel out beforehand the weight of the rotary shaft 1 and any error that might occur in fabrication and assemblying. Thus, when the rotary shaft 1 is inserted, the bearing surface $2e$ of the bearing $2_1$ coincides with the axis X and the squeeze film acting gap can be rendered uniform circumferentially in the damper portion 8. Also, by varying the eccentricity of the damper portion forming member $7_1$ and the bearing $2_1$, it is possible to effect adjustments of the direction of eccentricity.

From the detailed description set forth hereinabove, it will be appreciated that in this embodiment, it is possible to effect compensation for misalignment of the bearing $2_1$ with respect to the rotary shaft that might occur due to production error and assembly error, besides the deviation of the rotary body due to its weight. Thus, the squeeze film acting space in the damper portion 8 can be kept uniform at all times. This enables isotropy of the damping in the damper portion to be achieved to allow a damped bearing of high vibration control ability to be provided.

In the embodiment shown in FIG. 15, the inner peripheral surface $7d1$ of the damper portion forming member $7_1$ and the bearing surface $2e$ of the bearing $2_1$ are fabricated to become eccentric with respect to the respective outer peripheral surfaces so as to rotate these two members about the axis X to effect adjustments of the eccentricity of the bearing surfaces $2e$. It is to be understood, however, that the invention is not limited to this specific arrangement and that two members having inner peripheral surfaces which are eccentric with respect to the respective outer peripheral surface may be provided and made to rotate about the axis X. In this arrangement alos, it is possible to effect eccentricity adjustments in the same manner as described by referring to the embodiment shown in FIG. 15. For example, the bearing-side flange $3c$ of the spring body 3 shown in FIG. 15 is fabricated to have its inner peripheral surface become eccentric with respect to its outer peripheral surface. Thus, the spring body 3 may be rotated in place of the bearing or the damper portion forming member $7_1$, to enable eccentricity adjustments to be effected in like manner.

Figure 21:
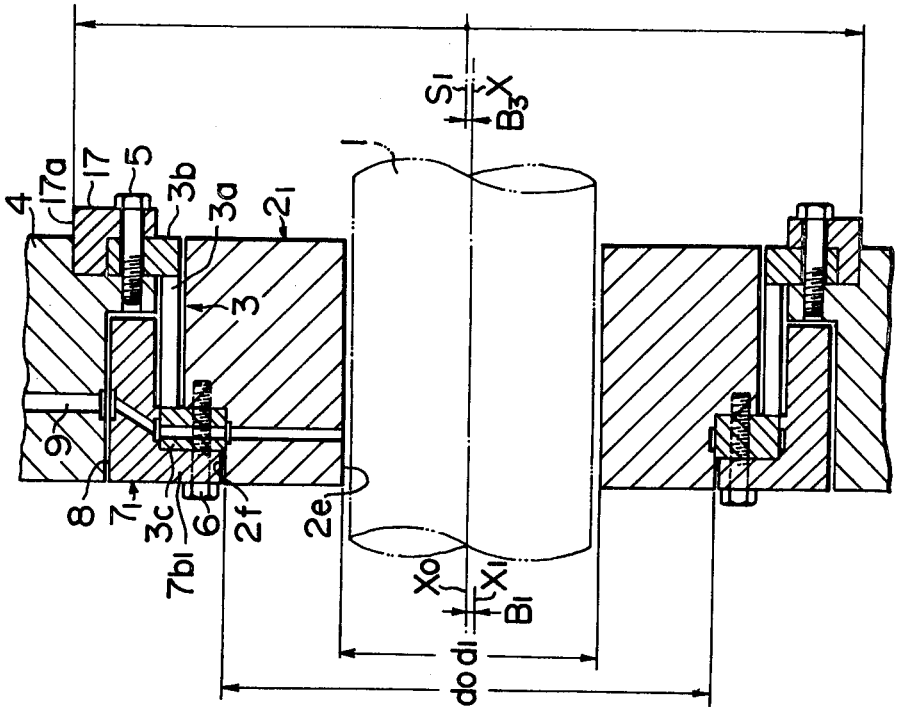
FIG. 21 is a vertical sectional view of a damped bearing comprising a sixteenth embodiment.

In FIG. 21, a single spacer 17 is mounted between the housing-side flange $3b$ of the spring body 3 and the housing 4 in such a manner that the center $S_1$ of its outer peripheral surface $17a$ is displaced upwardly by an eccentricity of $B_3$ with respect to the axis X and the center $X_1$ of the bearing surface $2e$ of the bearing $2_1$ is displaced downwardly by an eccentricity of $B_1$ with respect to the center $X_0$ (axis X) of the outer peripheral surface $2f$ of the stepped portion $2d$.

In this construction, the eccentricity and the direction of eccentricity of the bearing surface $2e$ can be adjusted in the same manner as described by referring to the embodiment shown in FIG. 15 by rotating the spacer 17 and the bearing 2 about the axis X.

Figure 22:
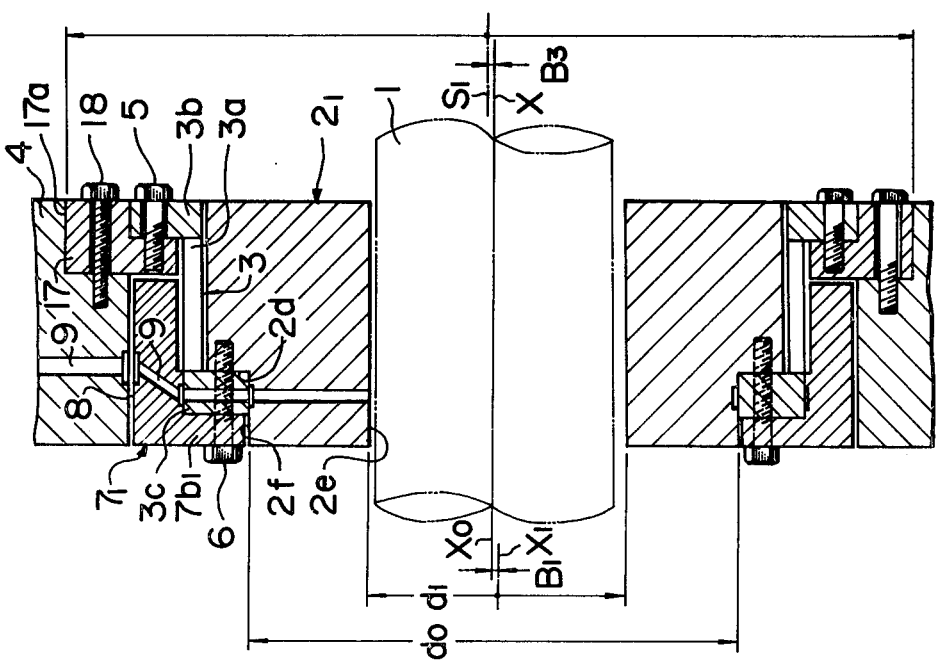
FIG. 22 is a vertical sectional view showing a modification to the fixing means of the spacer used in the sixteenth embodiment of the damped bearing according to the invention shown in FIG. 21.

In the embodiment shown in FIG. 21, the spacer 17 is secured to the housing 4 by bolts 18 and the housing-side flange $3b$ of the spring body 3 is secured to the spacer 17 by the bolts 5. However, as shown in FIG. 22, the spacer 17 and the housing-side flange $3b$ of the spring body 3 may be both secured to the housing 4 by the bolts 5. In FIG. 22, other parts are similar to those shown in FIG. 15. In FIGS. 21 and 22, the bolts 5 and 18 for fixing the spacer 17 in place are received in a plurality of peripherally disposed bolt holes as shown in FIGS. 16 and 17.

In the embodiments shown in FIGS. 21 and 22, the bearing surface $2e$ of the bearing $2_1$ and the outer peripheral surface $17a$ of the spacer 17 are fabricated to become eccentric. However, the inner peripheral surface or outer peripheral surface of one of the bearing $2_1$, spring body 3 and damper portion forming member $7_1$ and the inner peripheral surface or outer peripheral surface of the space 17 may be fabricated to become eccentric and the parts having the eccentric peripheral surfaces may be made to rotate about the axis X.

Figure 23:
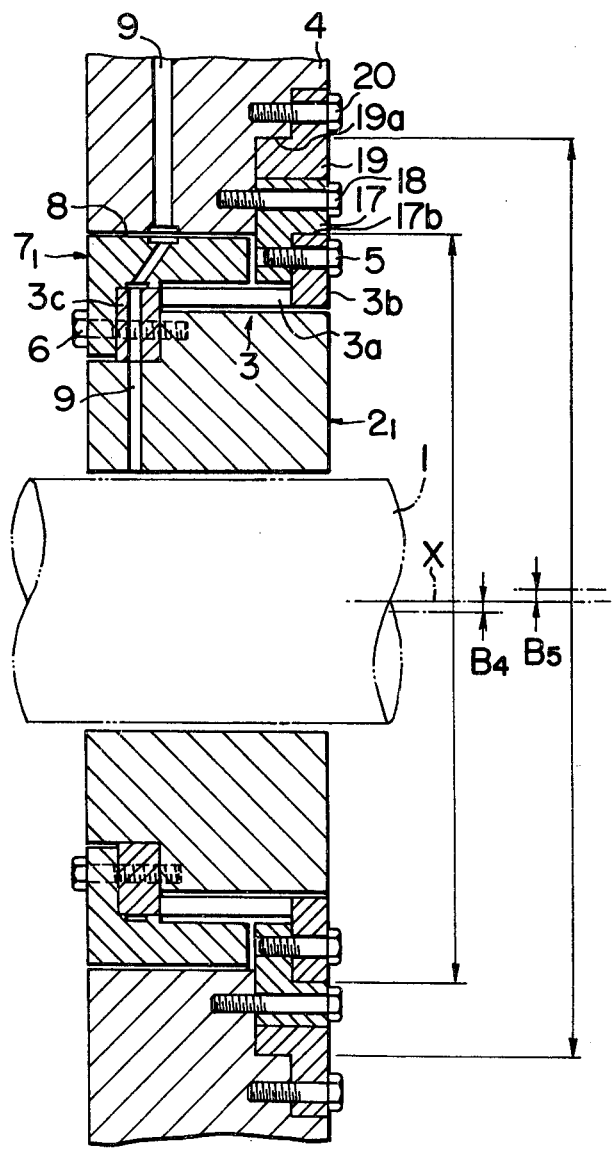
FIG. 23 is a vertical sectional view of a damped bearing comprising seventeenth embodiment.

In FIG. 23, two spacers 17 and 19 are mounted between the housing-side flange $3b$ of the spring body 3 and the housing 4 in such a manner that the center of an inner peripheral surface $17b$ of the inner space 17 in contact with the outer peripheral surface of the housing-side flange $3b$ of the spring body is disposed downwardly by an eccentricity of $B_4$ with respect to the axis X and the center of an outer peripheral surface $19a$ of the outer spacer 19 is displaced upwardly by an eccentricity of $B_5$ with respect to the axis X. The spacers 17 and 19 are secured to the housing 4 by bolts 18 and 20, respectively. The housing 4 is formed with a plurality of bolt holes arranged peripherally for receiving the bolts 18 and 20.

In this construction, by positioning and fixing in place the two spacers 17 and 19 after rotating them about the axis X, it is possible to obtain the desired eccentricity and the direction of eccentricity in the same manner as described by referring to the embodiments shown in FIGS. 15, 21 and 22.

Figure 24:
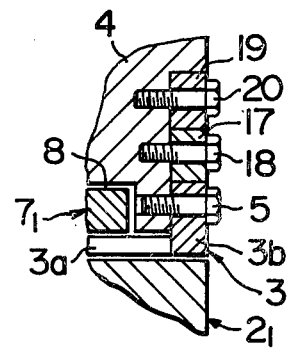
FIGS. 24–26 are respectively sectional views of modifications of the fixing means of the two spacers used in the seventeenth embodiment of the damped bearing according to the invention shown in FIG. 23.
Figure 25:
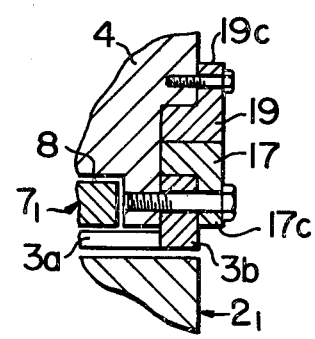
Figure 26:
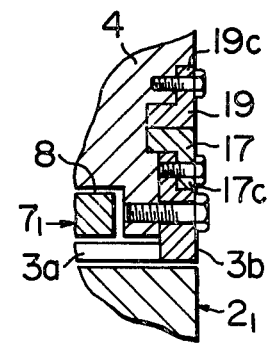

In the embodiment shown in FIG. 23, the inner peripheral surface 17b of the spacer 17 and the outer peripheral surface 19a of the spacer 19 are fabricated to become eccentric. However, the eccentricity and the direction of eccentricity can be adjusted as desired by fabricating the outer peripheral surface of the spacer 17 and the inner peripheral surface of the spacer 19 to become eccentric and rotating the spacers 17 and 18 about the axis X. In addition to the fixing means for fixing the housing-side flange 3b of the spring body 3 and the spacers 17 and 19 to the housing 4 shown in FIG. 23, means shown in FIG. 24 may be used which comprises bolts 5, 18 and 20 for independently securing the housing-side flange 3b and spacer 17 and 19 to the housing 4 respectively. In this case, the bolts 18 and 20 may have a strength less than that of the bolts 5 for fixing the spring body 3. Also, as shown in FIG. 25, the spacers 17 and 19 may be formed with flanges 17c and 19c, respectively. This increases the rigidity of the spacers 17 and 19. Also, as shown in FIG. 26, the flanges 17c and 19c of the spacers 17 and 19 may be fitted into the housing-side flange 3b of the spring body 3 and the side of the housing 4, respectively. This arrangement offers the advantage that the axial dimensions can be reduced.

In all the embodiments shown and described hereinabove, the spring portion of the spring bodies have a spring function composed of a plurality of ribs 3a arranged peripherally in spaced-apart relation. However, it is to be understood that the invention is not limited to this specific form of the spring portion, and that the spring portion may be in the form of a cylindrical spring.

What is claimed is:

1. A damped bearing device including a bearing means for journalling a rotary shaft, a spring body means for resiliently supporting said bearing means with respect to a housing, and a damper portion in the form of a squeeze film formed between said bearing means and said housing, characterized in that said spring body means comprises a housing-side flange secured to said housing, a bearing-side flange secured to said bearing means, spring means interposed between said two flanges and arranged in a plurality of layers, each of said layers including a plurality of rib means extending in an axial of said rotary shaft and circumferentially spaced from each other about an outer periphery of said bearing means, and intermediate flange means for connecting alternate ends of said rib means of said plurality of layers of said spring means together.

2. A damped bearing device as claimed in claim 1, wherein said ribs are arranged in a manner not to overlap each other in a radical direction.

3. A damped bearing device as claimed in claim 1, wherein said rib means of said spring means are arranged radially in two layers.

4. A damped bearing device as claimed in claim 1, wherein said rib means of said spring means are arranged radially in more than two layers.

5. A damped bearing device as claimed in claim 1, wherein at least two spring means are provided and are respectively arranged on opposite sides of said bearing means to support opposite ends of the bearing means.

6. A damped bearing device including a bearing journalling a rotary shaft, a spring body resiliently supporting said bearing with respect to a housing, and a damper portion in the form of a squeeze film formed between said bearing and said housing, characterized in that said spring body comprises a housing-side flange secured to said housing, a bearing-side flange secured to said bearing, a spring portion interposed between said two flanges and arranged in a plurality of layers on an outer peripheral side of said bearing in a manner so as to extend axially of said rotary shaft to have a spring function, and an intermediate flange connecting said plurality of layers of said spring portion together, said intermediate flange is provided at an end of each of the layers of said spring portion, and the intermediate flanges are connected together to thereby connect the plurality of layers of the spring portion, said spring portion comprising a plurality of ribs arranged peripherally in a spaced relationship with respect to each other, said ribs and said intermediate flange are located in a recess formed in a damper portion forming member, said housing-side flange of said spring body is connected to said housing through said damper portion forming member.

* * * * *